United States Patent [19]

Kronogård et al.

[11] Patent Number: 4,474,007
[45] Date of Patent: Oct. 2, 1984

[54] TURBOCHARGING DEVICE FOR AN INTERNAL COMBUSTION ENGINE

[75] Inventors: Sven-Olof Kronogård, Lomma; Clas-Olof Kronogård, GrÅbo; Håkan Kronogård, Lund, all of Sweden

[73] Assignee: AB Volvo, Sweden

[21] Appl. No.: 292,947

[22] Filed: Aug. 14, 1981

[30] Foreign Application Priority Data

Sep. 29, 1980 [SE] Sweden .................. 8006804

[51] Int. Cl.³ ............................................. F02B 37/00
[52] U.S. Cl. ...................................... 60/605; 60/624; 60/606; 417/407
[58] Field of Search ................. 60/597, 598, 605, 606, 60/624; 417/407

[56] References Cited

U.S. PATENT DOCUMENTS

| | | | |
|---|---|---|---|
| 1,921,907 | 8/1933 | Buchi | 60/605 |
| 2,200,744 | 5/1940 | Heinzelmann | 60/612 |
| 3,224,186 | 12/1965 | Wood | 60/624 X |
| 3,469,393 | 9/1969 | Tryhorn | 60/612 X |
| 3,513,929 | 5/1970 | Dae Sik Kim | 60/606 |
| 4,215,549 | 8/1980 | Daeschver | 60/606 |
| 4,233,815 | 11/1980 | Melchior | 60/606 |

FOREIGN PATENT DOCUMENTS

413998 7/1934 United Kingdom ............... 417/407

Primary Examiner—Michael Koczo
Assistant Examiner—Peggy A. Neils
Attorney, Agent, or Firm—Cantor and Lessler

[57] ABSTRACT

Outlet and inlet conduits of an internal combustion engine are united in, and carry a housing enclosing a rotor spool having one turbine and one compressor wheel. A cavity in the housing, the longitudinal axis of which is substantially parallel to a middle plane through the row of engine cylinders is adapted to receive the casing of the turbocharger, and may be designed in such a manner that the casing may be slid into the housing in the axial directions, without the housing having to be removed from the engine. Alternatively, the outlet and the inlet conduits may each, per se, be collected and form one half of the housing. The halves are brought together over the rotor spool, from both ends thereof. Resilient sealing members are preferably fitted between the two halves of the housing. A second exhaust gas turbine may be connected to the exhaust conduit from the supercharger, and may be adapted to drive at the power take-off shaft of the engine, or to drive some auxiliary.

1 Claim, 17 Drawing Figures

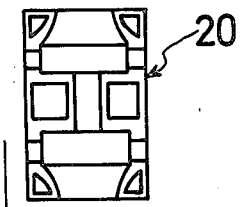
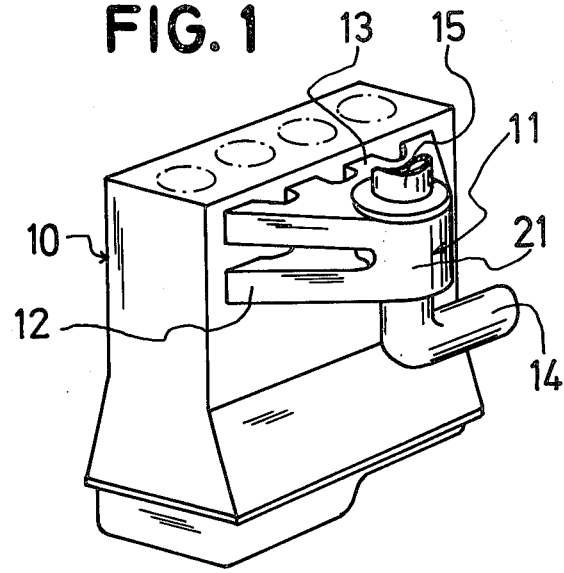
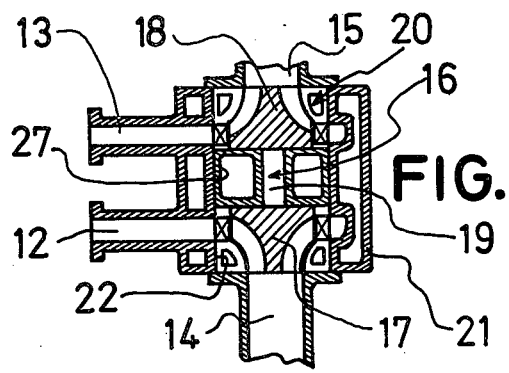
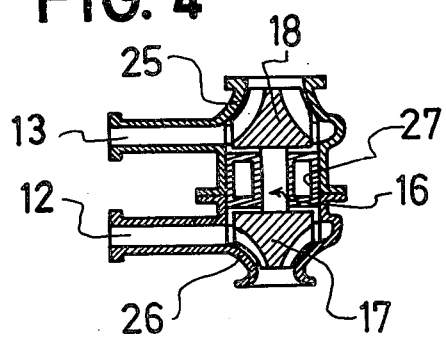
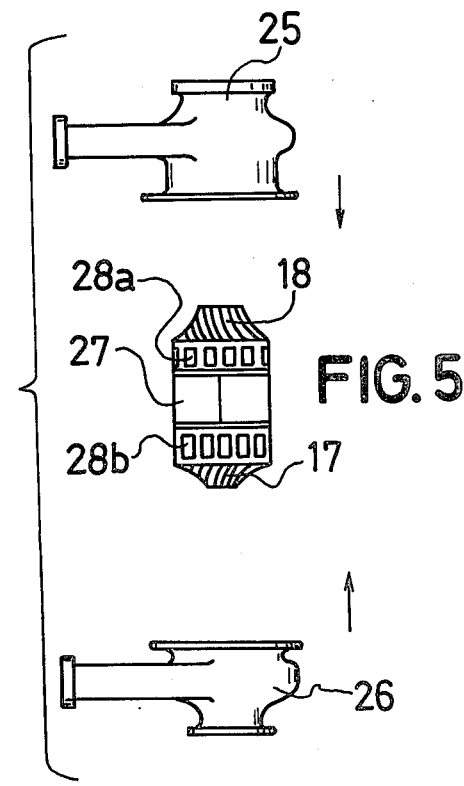

TURBOCHARGING DEVICE FOR AN INTERNAL COMBUSTION ENGINE

BACKGROUND OF THE INVENTION

The present invention refers to the supercharging of internal combustion engines, especially engines intended for automotive purposes, where increasing demands upon reduction of weight and volume mean that the available space will be restricted, but where the requirements concerning an easy servicing and substitution of components will be high.

The use of ceramic materials in the exhaust conduits, housings and turbine rotors make it possible to produce light and compact supercharging units, and one aim of the present invention is to propose simplified and compact housings for carrying the supercharging units, and connecting the same to the engine, which will well make use of available space, and be cheap and efficient, while simultaneously offering favourable servicing and maintenance.

SUMMARY OF THE INVENTION

A supercharging device according to the invention is characterized in that conduits communicating with outlet and inlet openings in the engine are brought together in an integrated housing, the longitudinal axis of which is substantially parallel to a longitudinal middle plane through the cylinders, and in which at least one turbine/compressor unit having an axially directed outlet and inlet is mounted.

The housing preferably encloses a cylindrical cavity, being fully open at least at one of its ends, while the turbine/compressor unit is mounted in a cylindrical casing, adapted to be slid into the cavity in the axial direction.

Alternatively the outlet and inlet conduits are each per se brought together in one half of a housing which is divided in a plane perpendicular to its longitudinal axis, and encloses a cavity adapted directly to receive the rotors of the turbine/compressor unit.

With a multi-cylinder unit the exhaust and inlet manifolds may enclose at least two turbine/compressor units operating in parallel. The turbocharger housing freely projecting from the engine block is well suited for the connection of a second exhaust turbine to its exhaust end. The shaft of this second turbine can transfer residual energy in the exhaust gases into mechanical power, for instance by connection to the crank shaft of the engine by way of a reduction gearing. Alternatively the shaft may be arranged to drive at least some of the engine's auxiliaries, for instance an electric generator, or for driving a hydraulic pump or a fly-wheel accumulator, with a hybrid power plant.

BRIEF DESCRIPTION OF THE DRAWINGS

FIG. 1 schematically shows a four cylinder internal combustion engine provided with a supercharging device according to the invention, FIG. 2 shows a vertical section through a supercharger unit according to the invention, FIG. 3 shows one half of the housing, for the turbine/compressor unit of FIG. 2, FIG. 4 shows a corresponding section through a modified design of a turbocharging device, FIG. 5 shows an exploded view of the housing and the turbine/compressor unit.

DESCRIPTION OF SOME PREFERRED EMBODIMENTS

Figure 6:
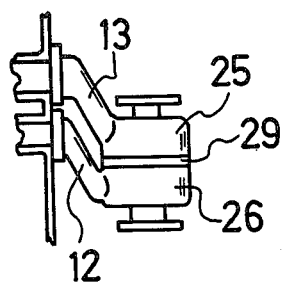
FIG. 6 shows a side view of a device illustrating the arrangement of connecting conduits for better utilization of available space.

FIG. 1 shows, very schematically, a four-cylinder internal combustion engine 10 having a supercharging device 11 arranged according to the invention. Exhaust and inlet openings are presumed to be located to the same side of a longitudinal middle plane through the engine, and for illustrating the principle the exhaust conduits 12 and the air conduits 13 are kept apart more than will be the case in a practical embodiment. The device 11 is arranged with its longitudinal axis vertically, and an exhaust pipe 14 is fitted to its lower end, while a conduit 15 from an air filter and/or a carburetor is attached to its upper end. The arrangement results in a compact installation including a minimum of conduity compared with the present day turbocharging installations.

The turbocharger unit comprises a rotor spool 16 including a turbine wheel 17 and a compressor wheel 18, which are mounted upon a common shaft 19. The rotor spool is, in the embodiment shown in FIG. 2, mounted in a cylindrical casing 20, which is divided in any suitable manner, for instance along a longitudinal middle plane, so the rotor spool 16 is easily enclosed.

The air conduits 13 and the exhaust conduits 12 are formed into a housing 21, which here is formed as an integral piece, but which possibly may be divided in a plane perpendicularly to the rotor axis. In the latter case there will be one first half to which the air conduits 13 are connected, and a second half to which the exhaust conduits 12 are connected. In the embodiment shown the housing 21 encloses a cylindrical chamber 22 into which the rotor casing may be slid from above, to rest upon suitable support in the lower part of the housing, or upon a flange at the upper end thereof. The rotor casing 20 is provided with suitable guide vanes and/or passages, which fit against corresponding passages in the wall defining the cavity 22.

FIG. 3 shows one half of a rotor casing 20, with the rotor spool removed.

With the modified embodiment shown in FIG. 4 the air and exhaust conduits, 13 and 12, respectively, are each formed in two halves 25 and 26, which together constitute the housing for the supercharger unit. Here the valves of the housing are internally formed to directly receive and cooperate with the rotor wheels 17, 18. Between the latter there is a space for a bearing 27, which is fitted in the enclosing half 25 of the housing.

FIG. 5 shows an exploded view of the components of FIG. 4. Annular members provided with guide vanes 28a and diffuser elements 28b are mounted upon the bearing casing 27 of the rotors.

FIG. 6 shows a side view of a housing and illustrates a modified connection arrangement with an aim better to utilize the available space around the engine, and which is especially suited for V-engines or installations where the engine is mounted in an inclined position. The housing is divided into two halves perpendicularly to the rotor axis, and the two halves of the housing are fitted together by means of resilient packings 29, which preferably include metal bellows or other elastic high-temperature resisting members. The latter may be so called E-, U- or O-rings permitting a limited movement. Mating cylindrical surfaces including O- or U-shaped metallic ring members may also be used.

As mentioned above considerable advantages may be obtained by using ceramic materials, especially at the hot-gas side of the system, while light-metal, such as Al- or Mg-alloys or composite materials, may be used on the air side. There will then be different thermal movements at the two halves of the housing, which must be compensated by suitable plays and efficient packings and sealings of resilient nature.

Figure 7:
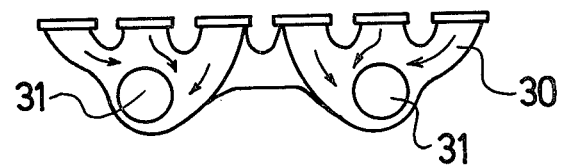
FIG. 7 shows a horizontal view of an exhaust manifold for a six-cylinder engine having two supercharger units.
Figure 8:
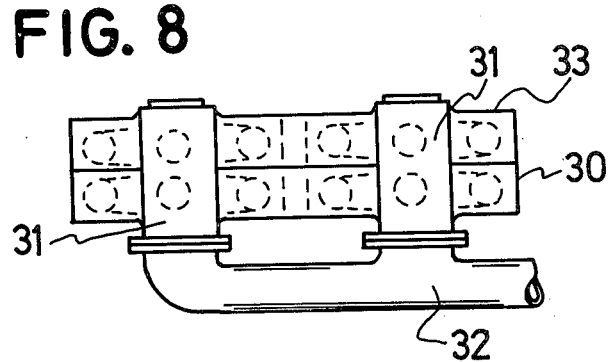
FIG. 8 shows a side view of the exhaust and inlet manifolds with an arrangement according to FIG. 7.

FIG. 7 shows the exhaust manifold 30 at a six-cylinder engine. In order that the supercharger shall not extend too far out from the side of the engine block, two small turbochargers 31 mounted side by side may advantageously be used. The exhausts thereof are advantageously brought together to a common exhaust pipe 32, as shown in FIG. 8, which is a side view of the arrangement according to FIG. 7, and with an inlet manifold 33 adjacent to the exhaust manifold. By series production of small turbocharger units considerable advantages are obtainable with the system described above.

Figure 9:
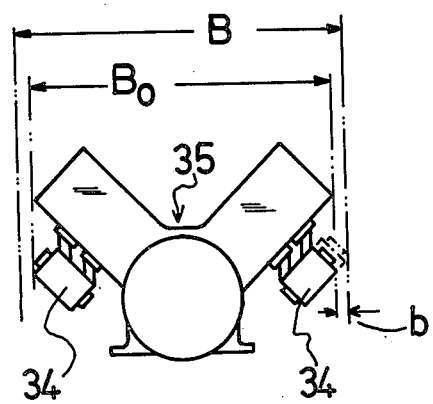
FIG. 9 shows a possible location of the supercharging devices at a V-engine.

FIG. 9 shows a possible location of turbochargers 34 at a V-engine 35. One turbocharger is preferably outside each row of cylinders in the engine. Due to the compact design of the engine it will be possible to maintain about the same breadth "$B_o$" with a turbocharged engine as with a naturally aspirated engine.

The turbocharger units have about the same shape as is shown in FIG. 6. If the breadth "B" of the available engine space permits, the exhaust and inlet conduits may be designed more straight, as is denoted by broken lines at the right hand side of the figure. The units will then extend outside of the engine by the measure "b" to each side thereof.

In the embodiments shown the turbocharger units have been fitted with their axes of rotation substantially vertical, which provides a simple design. It is, however, possible to mount the units so the axes of rotations are horizontal, in which case the manifolds from the exhaust openings and to the inlet openings, respectively, preferably are connected to opposite ends of the housing. The fitting of the rotor spool may be arranged in the same manner as described in connection with FIGS. 2 and 4.

The embodiment where the housing extends freely from the engine block is well suited for the fitting of a second exhaust gas turbine in installations, where the full energy content of the exhaust gases is not used for compressing the charging air. A combustor may, however, be provided for increasing the power extracted.

Figure 10:
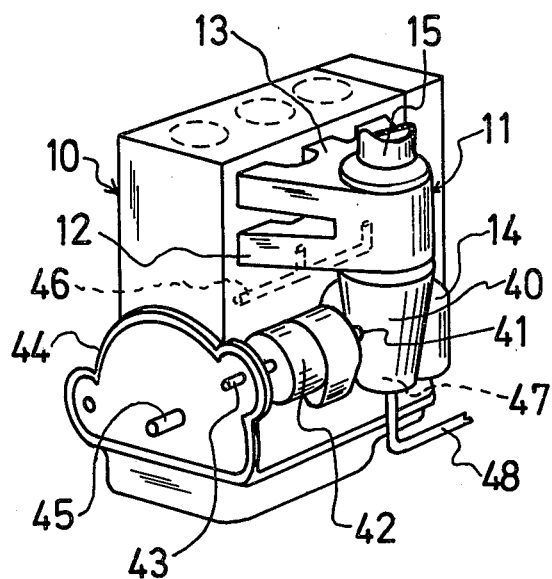
FIG. 10 shows an engine, similar to that of FIG. 1, but having a second exhaust gas turbine adapted to drive at the fly-wheel of the engine.

FIG. 10 shows an engine of the same type as is shown in FIG. 1. Exhaust and air conduits 13, 12 are connected to a housing 11, which encloses the rotor spool of the turbocharger (not shown). The air inlet is denoted by 15 and a second exhaust gas turbine 40 having a horizontal shaft 41, is fitted at the exhaust conduit 14.

A two-stage gearing 42 and a free-wheel (not shown) connect the turbine shaft 41 with the power output shaft 43 from the engine, which extends into the casing 44, partly enclosing the fly-wheel (not shown) of the engine. A gear or belt transmission, possibly of a variable type, may be used to transfer surplus energy in the exhaust gases to the output shaft 45.

The power of the supercharger turbine 17 may be increased by supplying fuel to the exhaust conduit 12. The exhaust gases will usually contain a sufficient amount of oxygen to support further combustion, and in the high temperature of the gases a rapid gasifying and ignition of injected fuel will occur.

Gaseous or liquid fuel is easily used, but it will be possible to operate with solid fuel, possibly suspended in a liquid or transferred into a gel. The injection device may be of the type common with burners, and is in the drawing indicated by a conduit 46.

In a similar manner it will be possible, alternatively, or in combination with the auxiliary burner described above, to supply additional fuel to the second exhaust gas turbine 40.

Figure 11:
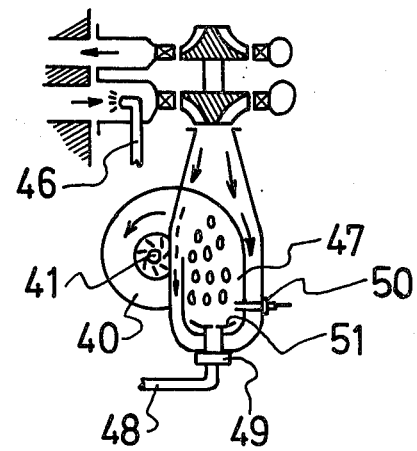
FIG. 11 shows, on a slightly larger scale, a combustor arrangement between the turbocharger unit and the second gas turbine of FIG. 10.

FIG. 11 shows, more in detail, a combustor 47 arranged in conjunction to the exhaust end of the housing 11. The combustor is arranged for reversed flow, which will provide for an increased length of the flame and will promote the gasifying of the fuel supplied by way of a conduit 48 to a burner 49 fitted at the lower end of the combustor and being provided with swirler means. The combustor is preferably formed with a conical inlet diffusor, which brings about a reduction of the gas velocity. Ignition is ensured by means of a spark plug 50, possibly in conjunction with a flame-holder 51.

Figure 12:
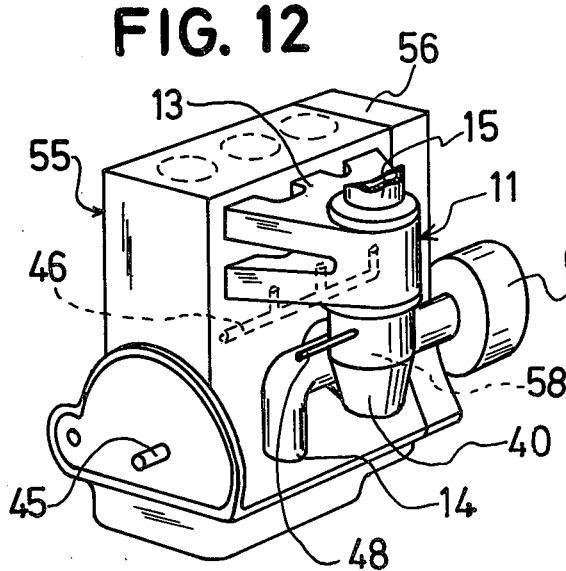
FIG. 12 shows a three-cylinder engine having a supercharging unit and a second gas turbine driving an auxiliary.

FIG. 12 shows a three-cylinder engine 55 provided with a supercharger mounted in a housing 11, of the same type as described above. A casing 56 encloses transmissions to associated auxiliaries. A second exhaust gas turbine 40 is also here connected to the exhaust conduit 14 from the housing 11, and may be used for driving an electric generator, or an hydraulic pump for loading an accumulator, for instance of the fly-wheel type 59, which is often used for hybrid power installations.

Figure 13:
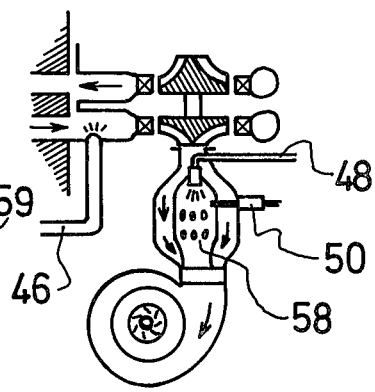
FIG. 13 shows, on a slightly larger scale, the combustor arrangement between the turbocharging unit and the second exhaust gas turbine of FIG. 12.

A pipe 46 for supplying fuel to the exhaust conduit 14 is also provided. A combustor 58 (see also FIG. 13) supplied with fuel through a pipe 48 is fitted in the exhaust conduit from the turbocharger housing 11.

The turbocharger turbine 17 and the second exhaust gas turbine 40 can be provided with adjustable guide vanes and/or a by-pass arrangement for improving the efficiency or increasing the power output, and for providing a high degree of flexibility. Turbochargers of the turbine type are usually the most convenient ones, but it will be possible to use rotors of the displacement type, for instance with radial wings.

Figure 14:
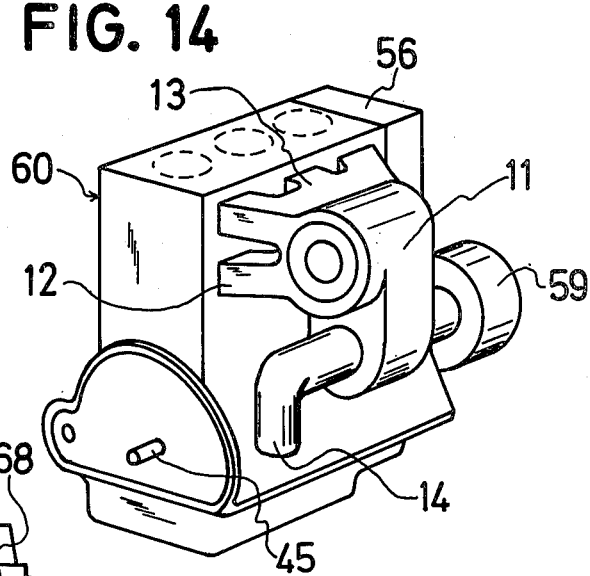
FIG. 14 shows an engine corresponding to that of FIG. 12, but with the shafts of the rotors arranged horizontally.
Figure 15:
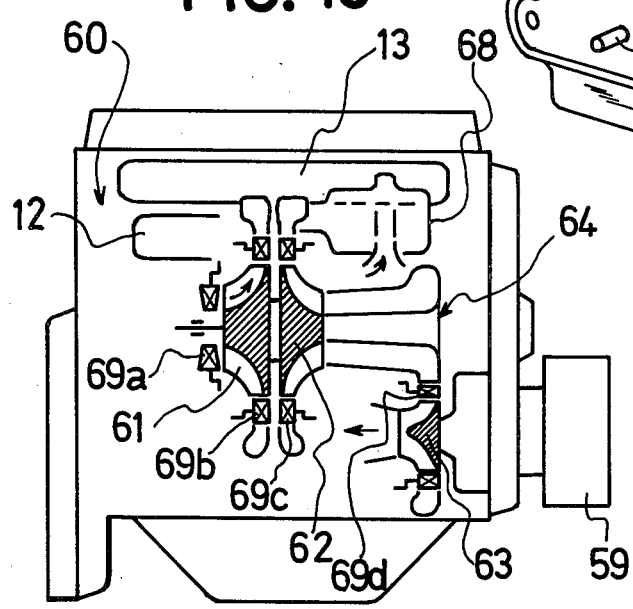
FIG. 15 shows schematically a cross section through the turbocharger unit of FIG. 14.

FIGS. 14 and 15 show an engine 60 of the same type as in FIG. 12 and having a turbocharger unit 61, 62 and a second exhaust gas turbine 63, which here are arranged with their shafts horizontally. Wherever applicable the same reference numerals as in FIG. 12 are used.

The design of the turbocharger unit is evident from FIG. 15. The compressor 61 and the turbine 62 driving the same are both of the radial type, where the latter is adapted to receive the gas in an inwardly directed flow. The second gas turbine 63 is of a similar design.

Figure 16:
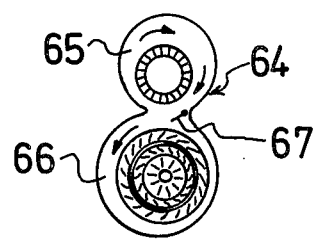
FIG. 16 shows a double volute for transferring gas from the turbocharger turbine to the second exhaust turbine.

The exhaust from the turbocharger turbine 62 passes by way of an axial passage and a double volute 64 -see FIG. 16 - to the second gas turbine 63. The chambers 65 and 66 of the double volute are designed so a smooth gas flow and a natural diffusor action are obtained.

Either or both internal walls are at the merging of one chamber into the other provided with an swingable lip 67, which permits adjustment of the size of the flow passage.

A combustor 68 is provided in the exhaust conduit 14 upstream of the turbocharger turbine 62 to augment the power thereof. The compressor 61 may be provided with adjustable inlet and outlet vanes 69a, b, and both turbines 62 and 63 are provided with inlet guide vanes 69d, c.

Figure 17:
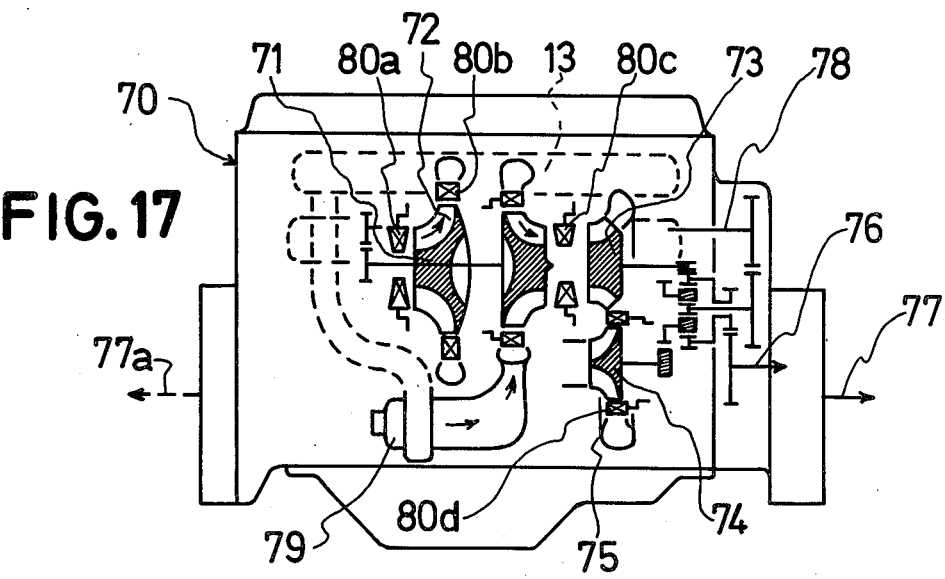
FIG. 17 shows a modified arrangement of the rotor unit.

FIG. 17 shows a development of the plant according to FIG. 15.

The engine 70 is of the same type as described above, and is provided with an air compressor 71, which is driven by a first exhaust gas turbine rotor 72. There are further a second and a third turbine rotors 73 and 74, respectively, arranged in series downstream of the first rotor. The turbine rotors 73 and 74 are located in the same vertical plane and the transfer of gas from the former to the latter occurs by way of a double volute 75 of the same kind as the one shown in FIG. 16.

A planetary gearing 76 interconnects the shafts of the two turbine rotors 73 and 74. The output shaft 76 of the gearing may be used for driving auxiliaries, or may be connected to the power take-off shaft 77. The engine is further provided with an alternative power-take off shaft 77a, indicated in broken lines.

An auxiliary shaft 78 makes it possible to transfer power both ways between the shaft mounting the compressor 71, and the first turbine motor 72, and the gearing. A combustor 79 is fitted in the exhaust conduit 13, upstream of the first turbine rotor 72. Adjustable guide vanes 80a, b, c, d are provided at the inlet to the compressor and at the inlets to all turbine rotors.

When the exhaust conduits, the combustor and the turbines are mainly manufactured of ceramic material, the service life of these components will be long and they will last as long as the engine. Rotors journalled in air bearings do not require much maintenance.

The ceramic materials have a specific gravity of about one third of that of steel, which will result in very light designs. Due to the high specific power obtainable, the engine plant will require small space. The exhaust gas turbines will be about half as big as those of present day's installations.

With Otto-engines a knock-control device is preferably provided, which senses possible variations in the top pressure in the cylinder and actuates a valve in a by-pass conduit. The engine may then be operated with a high BMEP without any tendency to knocking. This offers an opportunity for automatic adaptation to fuels of different octane-numbers and/or qualities.

Water injections may also be used and in order to obtain a favourable intermixing the water is preferably supplied through a nozzle upstream of the compressor of the turbocharger.

Turbine rotors of ceramic material are well suited to cope with exhaust gases obtained by burning solid fuel, such as powdered coal.

The invention is not limited to the embodiments shown, but the shape and the location of associated components may be varied in many ways within the scope of the appended claims.

What we claim is:

1. In a turbocharging device for a multi-cylinder internal combustion engine:
    (A) conduits for communicating with inlet and outlet openings at cylinders of said engine and brought together so as to merge into and carry a turbine and compressor housing formed as a unitary body and enclosing a cylindrical cavity with the longitudinal axis thereof substantially parallel to a longitudinal middle plane through said cylinders, said housing being integral with said conduits,
    (B) said cavity having an axially directed inlet and outlet and being fully accessible from one of its ends,
    (C) a compressor and a turbine mounted upon a common shaft as an integral unit, and
    (D) a cylindrical casing enclosing said unit adapted to be slid into said cavity through said open end thereof and having passages which in mounted position fit against said inlet and outlet conduits at their merging into said housing.

* * * * *